Aug. 12, 1924.

W. J. GIBBS 1,504,886

CONVEYING MACHINE

Filed Dec. 11, 1922     3 Sheets-Sheet 1

INVENTOR.
William J. Gibbs
BY
ATTORNEYS

Aug. 12, 1924.

W. J. GIBBS 1,504,886

CONVEYING MACHINE

Filed Dec. 11, 1922    3 Sheets-Sheet 2

INVENTOR.
William J. Gibbs
BY
Hauff Sbarland
ATTORNEYS

Aug. 12, 1924.

W. J. GIBBS 1,504,886

CONVEYING MACHINE

Filed Dec. 11, 1922    3 Sheets-Sheet 3

INVENTOR.
William J. Gibbs
BY
Hauff Harland
ATTORNEYS

Patented Aug. 12, 1924.

1,504,886

UNITED STATES PATENT OFFICE.

WILLIAM J. GIBBS, OF BROOKLYN, NEW YORK.

CONVEYING MACHINE.

Application filed December 11, 1922. Serial No. 606,047.

*To all whom it may concern:*

Be it known that I, WILLIAM J. GIBBS, a citizen of the United States, residing at Brooklyn, in the county of Kings and State of New York, have invented new and useful Improvements in Conveying Machines, of which the following is a specification.

This invention relates to a conveyer in which vertically arranged endless carriers, one surrounding the other are actuated at the same speed in order to elevate or lower food-stuffs or other objects from different floors of a building.

The invention is designed to provide a conveyer substantially forming a single unit made to move up and down in a shaftway while the articles to be carried such as trays with food thereon are supported between the inner and outer carrier.

An object of the invention is, to arrange the driving mechanism in a compact space and at the same time operate the inner and outer carrier at the same ratio of speed in one direction so that one side will move upward while the other side moves downward.

Another object of the invention is, to provide automatic devices located at the terminal of the conveyer actuated by an ascending or descending tray for stopping a motor geared to the endless carriers.

The invention resides more particularly in the novel combinations hereinafter described and claimed, reference being made to the accompanying drawings in which—

Figure 1:
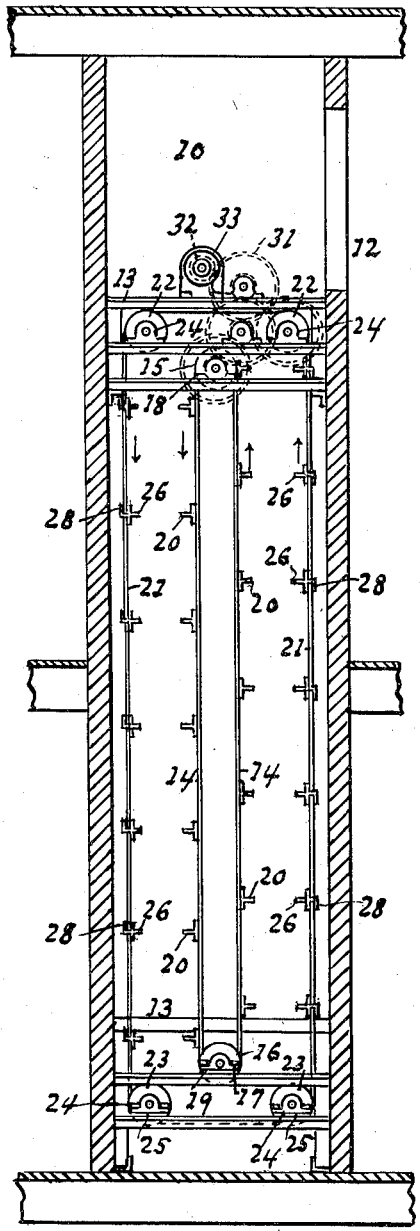
Fig. 1 is a front elevation of a machine embodying this invention showing the shaftway in section.
Figure 2:
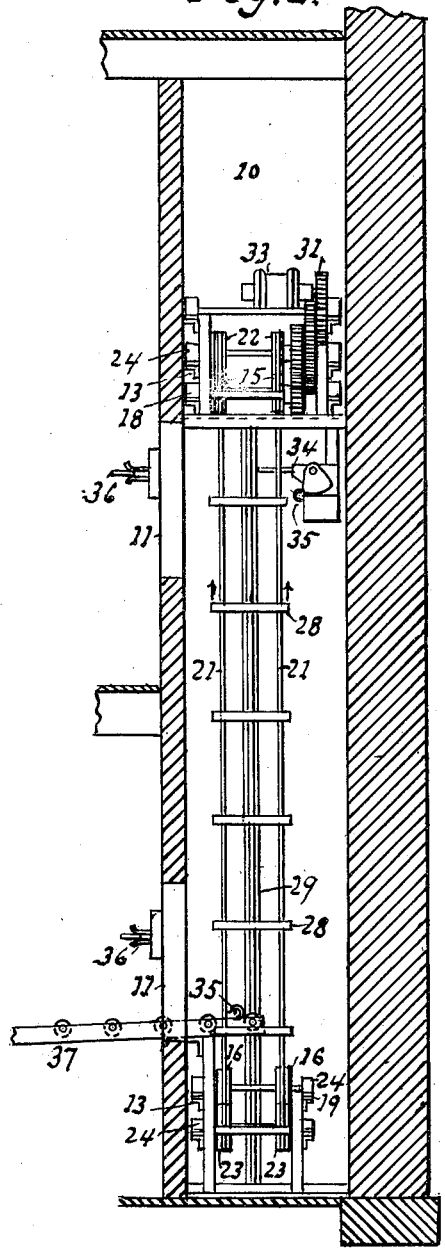
Fig. 2 is a side elevation of the same.
Figure 3:
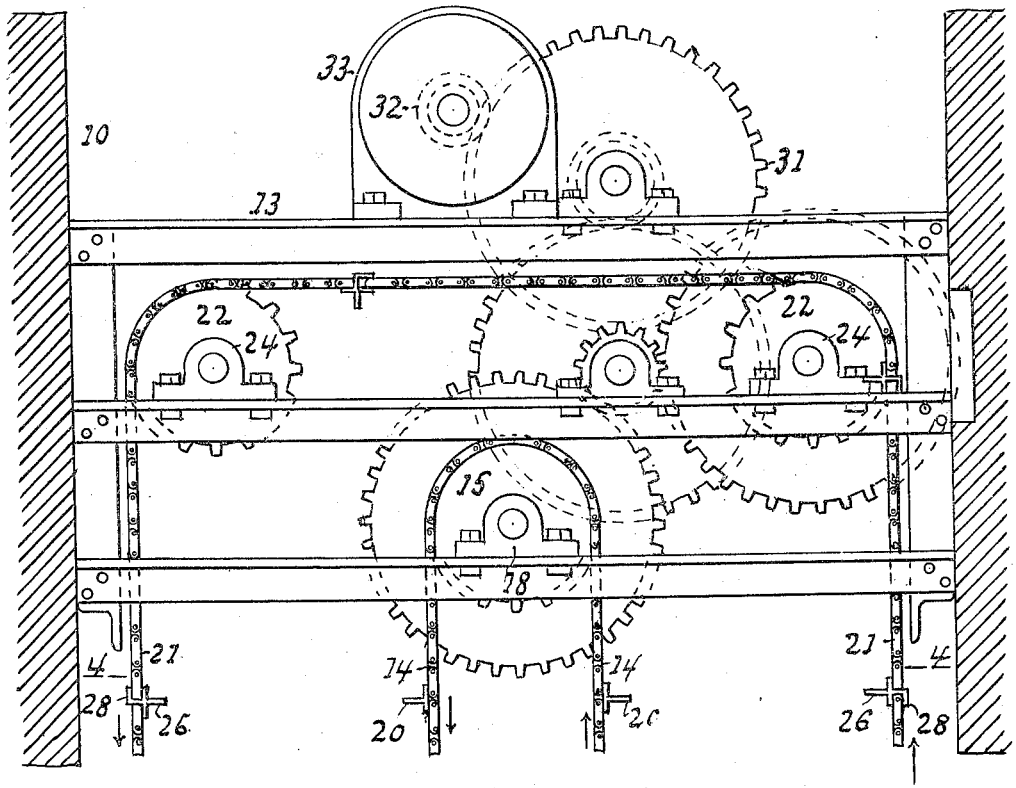
Fig. 3 is a front elevation showing the driving mechanism on a larger scale.
Figure 4:
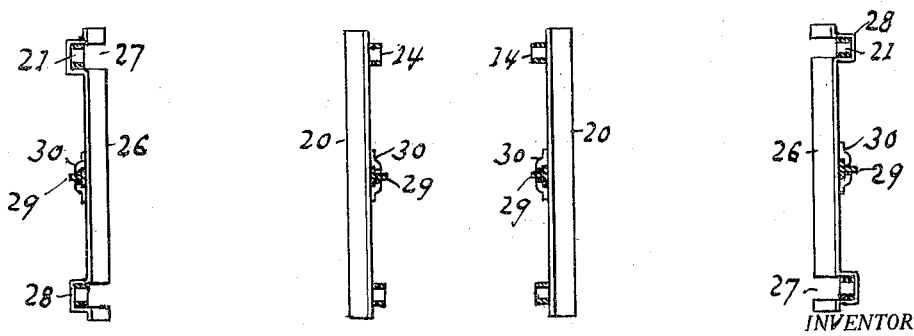
Fig. 4 is a horizontal section taken along the line 4—4 of the same.

In the drawing the numeral 10 designates a shaftway which is provided with upper and lower openings 11 to give access from the different floors of a building to the shaftway. The wall of the shaftway also has an opening 12 to permit inspection, oiling or repair of the machine located in the upper part of the shaftway. The walls of the shaftway support an upper and lower frame 13 built of vertical and transverse angle members to carry the upper and lower mechanism of the carriers.

The means for raising and lowering the articles consists of a vertical endless carrier including, a pair of chains or belts 14 engaged by the respective upper and lower pairs of sprocket wheels 15 and 16 journaled in bearings 17 and 18 bolted on the frames. The bearings 17 rest on shims 19, as indicated in Figure 1, whereby the chains can be slacked or tightened as desired. Secured to the chains are a series of shelves 20 each forming a T member having a horizontal portion projecting from the outer side of the chains and vertical head portions, the function of which will be hereinafter described.

On the outside of the above chains and made to surround the same are arranged a second pair of chains 21 engaged by two pairs of sprocket wheels 22 at the top and two pairs 23 at the bottom. The sprockets are journaled in bearings 24 bolted to the frame, and shims 25 disposed between each of the lower bearings and the frame provide adjustment to take up the slack or tighten the chains.

Figure 5:
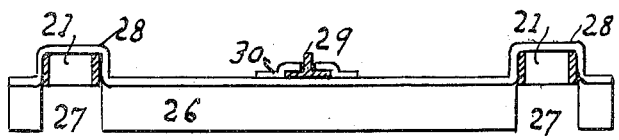
Fig. 5 is a plan view of a shelf employed with the outer carrier.
Figure 6:
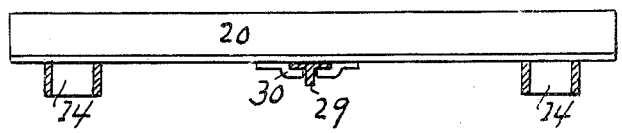
Fig. 6 is a similar view of a shelf for the inner carrier.
Figure 7:
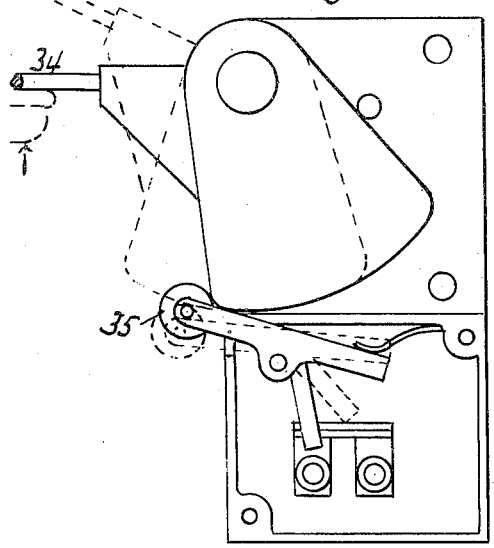
Fig. 7 is a side view of an upper switch.
Figure 8:
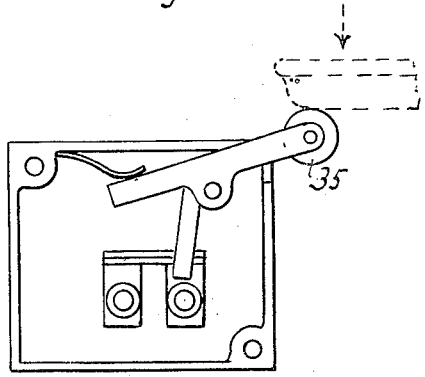
Fig. 8 is a similar view of the lower switch.

A series of T irons 26 are fastened to the chains. Each iron has a horizontal stem to form a shelf projecting inwardly from the chains opposite to the T member 20 on the inner endless chain. The vertical head of the T is secured to the chain and it in conjunction with the opposite headed T constitute guides to prevent the edges of the tray from getting into contact with or hitting the chain when sliding it onto the stems. The T on the outside chain 21 has slots 27 adjacent to the chain to permit the T to pass about the sprocket, and it is fastened to the outer portion of the chain by looping a portion 28 about the side and front of the chain, best seen in Fig. 5. The horizontal projecting portions of the shelves are thus constructed to support a tray on either side depending on the direction of travel.

Each chain is held rigid horizontally, or in other words guided to move only vertically by means of a vertically fixed T member 29 extending from the top to the bottom terminal and coacting with the backs of the shelves. The T is secured to the frame and channelled guides 30 secured to the shelves permit the chain to freely travel up and down thus carrying the shelves with it while the T remains stationary.

The means for driving the carriers or chains in the same direction at the same ratio of speed comprises a train of gears 31 connecting the upper sprocket shafts with a pinion 32 driven by an electric motor 33 mounted on the frame above the sprockets. The gears are ratioed to drive the inner and outer carriers at the same speed and in a single direction. The arrangement of the sprockets 22 whereby the outer chains travel around the inner chains transmit upward movement to one side of the chains while the other side descends.

In order to stop the chains at the upper terminal a switch having a counter weighted cam arm 34 extending across the path of an ascending tray is provided. The rim of the tray strikes the arm and the cam rides over the roller 35 mounted on one end of an oscillating switch lever, to open the circuit and thereby stop the motor. When the tray is removed the arm automatically moves back to its original position to coact with the next tray and close the circuit.

At the lower terminal is located a similar switch to control the rotation of the motor. This switch however does not need a cam arm for the reason that the bottom of a descending tray strikes the roller 35 on the end of the contact lever, to open the circuit and stop the motor. Knife or key push switches 36 on each floor open or close the circuit from a generator or other source of electricity to the motor. A roller chute 37 located at the terminal is adapted to carry the descending tray to a suitable place on the lower floor.

I claim:

1. In a conveying machine the combination with an endless carrier, of an endless carrier surrounding the same, means on both carriers for supporting an object, and means for driving the carriers at the same speed.

2. In a conveying machine the combination with a vertically arranged endless carrier, of an endless carrier surrounding the same, means on both carriers for supporting an object, and means for driving both carriers at the same speed.

3. In a conveying machine the combination with a vertically arranged endless carrier, of an endless carrier surrounding the same, means on both carriers for supporting an object, and means for driving both carriers at the same speed in one direction.

4. In a conveying machine the combination with a vertically arranged endless carrier, of an endless carrier surrounding the same, means on both carriers disposed opposite to each other for supporting an object between the inner and outer carriers, and means for driving both carriers at the same speed in one direction.

5. In a conveying machine the combination with a vertically arranged endless carrier, of an endless carrier surrounding the same, means on both carriers opposite to each other for supporting an object one portion ascending while the other portion descends, and means for driving both carriers at the same speed in one direction.

6. In a conveying machine the combination with a vertically arranged endless carrier, of an endless carrier surrounding the same, shelves located at the inner and outer portion of the respective carriers, one being opposite the other for supporting a tray between the inner and outer carriers, and means for driving both carriers at the same speed in one direction one portion ascending while the other descends.

7. In a conveying machine the combination with a vertical endless carrier, of an endless carrier surrounding the same, shelves disposed at the inner and outer portion of the respective carriers one being in a line with the other for supporting a tray when ascending or descending, and means for driving both carriers at the same speed in one direction one portion ascending while the other portion descends.

8. In a conveying machine the combination with a vertical endless chain carrier, of an endless chain carrier surrounding the same, shelves disposed at the inner and outer portion of the respective carriers, one being in a line with the other for supporting a tray when ascending or descending, and a train of gears for driving carriers at the same speed in one direction one portion ascending while the other portion descends.

9. In a conveying machine the combination with a vertical endless chain carrier, of an endless chain carrier surrounding the same, shelves disposed at the inner and outer portion of the respective carriers one being in a line with the other for supporting a tray when ascending or descending, means for driving both carriers, and means controlled by the tray for automatically stopping the driving means.

10. In a conveying machine the combination with a vertical endless chain carrier, of an endless chain carrier surrounding the same, shelves disposed at the inner and outer portion of the respective carriers one being in a line with the other for supporting a tray when ascending or descending, means for driving both carriers at the same speed in one direction one portion ascending while the other portion descends, and means controlled by the tray for automatically stopping the driving means at the upper and lower terminal.

11. In a conveying machine the combination with a pair of vertical endless chains, of a pair of endless chains surrounding the same, means for driving the chains, and shelves secured to both pairs of chains having horizontal portions projecting inwardly from the surrounding chains while the horizontal portions of the inner chains project outwardly to support a tray therebetween.

12. In a conveying machine the combination with a pair of vertical endless chains, of a pair of endless chains surrounding the same, means for driving the chains, and T shaped shelves secured to both pairs of chains having their horizontal stems projecting inwardly from the surrounding chains while the stems of the inner chains project outwardly to support a tray therebetween either on the upward or downward movement of the chains.

In testimony whereof I have hereunto set my hand in the presence of two subscribing witnesses.

WILLIAM J. GIBBS.

Witnesses:
 EILEEN SISSONS,
 WILLIAM MILLER.